Jan. 15, 1963 H. BLACKBURN 3,072,957
MIXERS
Filed April 21, 1960
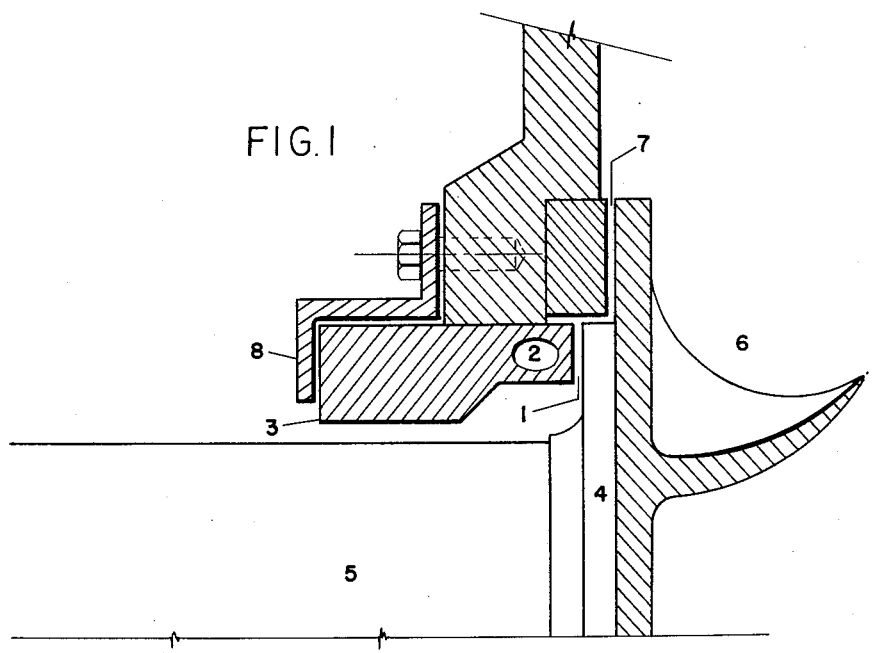
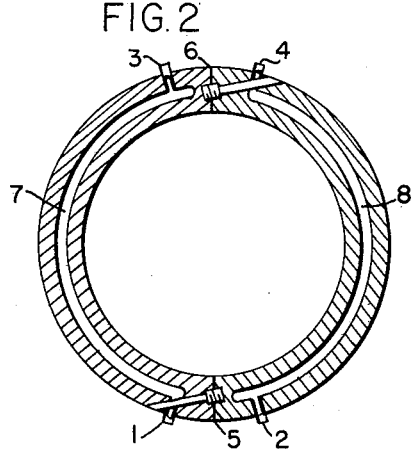
Howard Blackburn
INVENTOR.
BY *H B Roberts*
ATTORNEY United States Patent Office 3,072,957
Patented Jan. 15, 1963

3,072,957
MIXERS
Howard Blackburn, Texas City, Tex., assignor to Monsanto Chemical Company, St. Louis, Mo., a corporation of Delaware
Filed Apr. 21, 1960, Ser. No. 23,817
3 Claims. (Cl. 18—2)

The present invention pertains to mixers or masticators such as internal mixers, commonly referred to as Banbury type mixers, and extruders and is particularly concerned with the provision of a novel seal between the rotor and the body of the internal mixer or extruder.

The commonly known internal mixers of this type comprise what is known as a double cylindrical chamber in that the chamber consists of two cylinders placed side by side with their axes in a parallel-horizontal relation, the cylinders communicating with each other at their adjacent outer peripheral portions. A rotor is provided in each of the cylinders and each rotor is provided with blades, the tips of which approach closely to the walls of the respective cylinders. The chamber formed by the two communicating cylinders is closed with end plates through which the two rotors extend connecting on the exterior of the chamber to the drive mechanism.

Extruders used in the rubber and plastics industry for which this invention is applicable are known as single screw extruders and are usually employed in the conveying of masticated rubber or plastic from the inlet hopper above the extruder to the extruder head and ejecting a stream of rubber or plastic free of air or gas bubbles shaped according to the die in the head of the extruder. The back of the screw is held in position by an end plate through which the rotor extends to the drive mechanism.

In the rubber and plastics industry excessive loss of material has been a problem. Masticated rubber or molten plastic under pressure in an internal mixture or extruder may be forced out past the mechanical seals around the rotor shaft and accumulated in considerable amounts on the floor around the rotor. Also, it may get in the drive mechanism causing considerable down-time, or on the rotor itself resulting in periodic shutdowns to clean the rotor and place it in condition for operation again. This means decreased on-stream time, higher maintenance costs, and a significant loss of material from the leaking seals. All internal mixers and extruders have heretofore been designed with grease lubricated mechanical seals to stop the molten plastic material from extruding past the rotor. This scheme had never been completely successful as an effective seal.

The object of the present invention is to provide a seal between the chamber and the rotor of a mixer for plastics and rubber materials, which will eliminate or substantially reduce the loss of materials from the chamber of the mixer. Another object is to provide a seal that will harden the molten plastic or rubber in contact with it and therefore control the amount of material lost. Another object is to harden the masticated material so that any lost material forms a dry dust which does not interfere with the operation of the mixer. A further object of the invention is to provide a seal that will not cause downtime from the operation of the unit because of leakage of the molten material through the seal. These and other objects of the invention will become apparent from the following description of the invention.

This invention relates to an improved apparatus for mixing rubbers and plastics having incorporated therein an improved shaft seal comprised of an annular device having an opening therein adapted for the passing of a cooling medium therethrough. According to the invention, molten plastic or rubber is sealed inside the chamber of a mixer by means of a mechanical seal around the drive shaft which extends through the body of the mixer to the drive gears and power supply. This seal is nonlubricated, does not depend on a spring or other device to force it closed and is cored with at least one channel adapted for the passage of cooling fluids to cool and solidify the material as it comes in contact with the seal and thus stop the flow of molten plastic or masticated rubber past the seal.

The invention is illustrated by, but not limited to, the drawings wherein FIGURE 1 shows a cross-section of the seal device and the essential mixer parts in the adjacent area. FIGURE 2 depicts the entire annular seal with a cross-section along the cored channel through which the cooling medium passes.

In FIGURE 1, item 3 is a section of a circular seal which is fixed in place and has no force behind it to press against the shaft ring 4, which in the usual operation of the seal without use of this invention would wear against the seal and form metal dust. The ellipse area, 2, shown on the cut-away of the seal is the cooling medium channel through which a fluid flows to keep the seal at a low temperature compared to its surroundings. Item 5 is the shaft which drives the mixing apparatus or extruder screw inside the chamber 6. Molten plastic or rubber in the chamber 6 is forced through the clearance space at 7 since there is a definite clearance at that point to eliminate friction of the turning shaft and the body of the mixer or extruder. When the plastic or rubber extrudes through this passage beginning at 7, it comes into contact with the seal at 1 and begins to harden and ceases to flow. By the time the plastic or rubber has filled the narrow space between the seal and the shaft ring, it has completely solidified and then acts as a stop to keep the molten material behind from extruding out and thus serves as an effective seal for itself. As the shaft ring turns with the shaft and wears against the plastic or rubber hardened on the seal, the material wears and a dust is formed which falls harmlessly to the floor under the shaft. More molten plastic or rubber then extrudes into the space and solidifies into a solid material to take the place of that dusted out. Item 8 is the clamp which holds the seal firm but allows a clearance of 3–5 thousandths of an inch between the seal and the shaft ring.

While pictorially designating the cored channel in FIGURE 2, the inlets and outlets from each split half of the seal assembly and the means that hold the two halves of the seal together are also shown. As shown in FIGURE 2, a cooling fluid enters at 1 and 2 into the two halves of the seal and leaves at 3 and 4 after traveling through the seal around a 180° path. The two halves of the seal are joined together at 5 and 6. This 180° channel scheme with two inlets and outlets eliminates the possibility of leakage at the point at which the two halves are joined. The channels in each half of the seal are designated as 7 and 8.

The invention may be illustrated by the Bunbury mixing polyethylene but is not limited thereto. Polyethylene was mixed batchwise in the Banbury chamber under sufficient heat, approximately 110–112° C., to melt and maintain the polyethylene batch in a molten state. This material was mixed and masticated by means of the blades which sheared the polyethylene against the walls of the mixer and thus created sufficient pressure to force the polymer through any small passage or opening in the body of the mixer. Molten polyethylene was by this means extruded through the clearance passage between the mixer body and the shaft shown at 7 in FIGURE 1. The molten polyethylene contacted the seal at 1 in FIGURE 1 and hardened so that the space between the seal and the shaft ring was filled with solidified polyethylene which acted as a seal to stop any further leakage of the molten polymer. This solidified polymer also acted as a wear ring and dusted out as the seal turned against the shaft ring. This resulted in a substantial lessening of the loss of polyethylene through the seal than heretofore and also resulted in no lost operating time because of molten polyethylene coating the shaft.

The unique and significant advantage of this invention is that the seal is cooled and when the plastic or rubber extruded from the chamber of the mixer or extruder contacts the seal it immediately solidifies and ceases to extrude through the seal. Thus, the seal is effective to stop the flow of molten material. Any plastic or rubber lost is a result of the grinding of the rotor and seal against the hardened materials and only dust in small quantities is lost from the process. Furthermore, the dust is in a hard dry state and merely falls to the floor and can be easily cleaned up rather than coating the rotor or drive mechanism and thus causing operating difficulties.

This type of seal is also unique in another feature not usually associated with mechanical seals, in that it revolves free of contact with the body of the chamber wherein the plastic or rubber resides and does not wear metal to metal which always shortens life of a mechanical seal and also allows metal dust to enter the mixer or extruder chamber and contaminate the material therein. This, of course, is accomplished by means of the solidified layer of plastic or rubber which fills the space between the seal and body of the mixer or extruder and allows dusting of the plastic or rubber layer only.

Another desirable feature of the invention is the elimination of any lubrication in the seal which was thought necessary in seals of this type heretofore. The disadvantages of using lubrication in the seal is that any foreign material used somehow works its way into the mixer or extruder chamber and contaminates the material therein.

This seal is useful on any kind of mixer which handles the mixing or mastication of a plastic or rubber and is driven by a shaft which protrudes into the chamber of the mixer, that is, an internal mixer or extruder, where the molten plastic or rubber is being treated or processed. This invention is most useful in a Banbury type mixer where considerable pressures are encountered as the mixing blade and the polymer contact each other against the walls of the mixer chamber and the molten material is readily susceptible to flow into any passage along the wall of the chamber.

The apparatus embodying the fluid cooled, nonlubricated seal disclosed here may be employed in the mixing or extruding of any well known plastic or rubber, for instance, polymers such as polyethylene, polypropylene, polyvinyl chloride, and polystyrene, etc. and rubbers such as natural rubber, polyisoprene, polychloroprene, and the various synthetic diene type rubbers, such as butadiene-styrene rubbers and other heavy plastic and rubbery materials which may be co-polymers of rubbers and plastics, etc.

Materials of construction for the fluid cooled dust seal of this invention may be any of the well known castable and/or machinable compositions such as cast aluminum bronze, cast iron, bronze, aluminum, or stainless steel not subject to corrosion and any nonmetallic rigid material with good heat transfer characteristics which can be designed to withstand internal pressures of 25 to 75 p.s.i.g. The important features of the materials are that they be noncorrosive and have sufficient strength to withstand fluid pressures of 25 to 75 p.s.i.g. as well as have desirable heat transfer capabilities. It is also important that the construction material be easily workable and capable of soldering or welding since the fluid channel must be grooved out of the ring and the parts soldered or welded together.

Although temperature in the mixer is not critical in the practice of this invention and will vary with the material being masticated, it is significant in that the temperature must be sufficient to transfer the plastics or rubber material in the mixer chamber into a workable state and maintain that condition. Likewise, the temperature of the cored, cooled seal must be low enough to solidify the plastic or rubber from inside the mixer chamber as it comes in contact with the seal. This, of course, means that the cooling fluid must be at a temperature at least slightly below that required for solidification of the particular plastic or rubber contained in the mixer.

Any cooling fluid with desirable heat capacity characteristics can be employed in practicing this invention. Fluids such as water, alcohols, for instance methanol or isopropyl-alcohol, brines, for instance sodium or calcium salt brine, oils, for instance mineral oil or motor lubricating oil, or other organic liquids, for instance Freon or glycols, are suitable for this use. Steam or other vapors could be utilized but none would be a preferred medium in the practice of this invention.

What is claimed is:

1. In an apparatus for mixing rubbers and plastics comprised of a housing for containing said rubbers and plastics in a confined space, a rotatable shaft having means attached thereto for mixing and shearing said rubbers and plastics, means for driving said shaft; an improved seal for said rotatable shaft adapted for confining said rubbers and plastics within said confined space comprised of an annular device around said rotatable shaft and attached to the said housing by non-permanent means, said annular device having a cored channel therein adapted for the passing of a cooling medium therethrough.

2. In an apparatus for mixing rubbers and plastics in a confined space, a rotatable shaft having means attached thereto for mixing and shearing said rubbers and plastics, means for driving said shaft; an improved seal for said rotatable shaft adapted for confining said rubbers and plastics within said confined space comprised of an annular device around said rotatable shaft and attached to the apparatus housing by non-permanent means, said annular device having a cored channel therein adapted for the passing of a cooling medium therethrough wherein said cooling medium cools the surface of the seal such that the molten rubber and plastic hardens and solidifies on the surface of the seal and stops the flow of molten rubber and plastic from the said confined space.

3. The improved sealing device of claim 1 wherein the materials of construction are selected from the group consisting of cast aluminum bronze, cast iron, bronze, aluminum and stainless steel.

References Cited in the file of this patent

UNITED STATES PATENTS

| | | |
|---|---|---|
| 682,390 | Schrader | Sept. 10, 1901 |
| 730,925 | Klein | June 16, 1903 |
| 781,266 | Bryant et al. | Jan. 3, 1905 |
| 2,203,288 | Willetts | June 4, 1940 |
| 2,295,942 | Fields | Sept. 15, 1942 |
| 2,356,585 | Hempel | Aug. 22, 1944 |
| 2,698,962 | Swallow | Jan. 11, 1955 |
| 2,725,220 | Hale et al. | Nov. 29, 1955 |
| 2,777,254 | Siefert et al. | Jan. 15, 1957 |
| 2,969,248 | Sulkowski | Jan. 24, 1961 |

UNITED STATES PATENT OFFICE
CERTIFICATE OF CORRECTION

Patent No. 3,072,957

January 15, 1963

Howard Blackburn

It is hereby certified that error appears in the above numbered patent requiring correction and that the said Letters Patent should read as corrected below.

Column 2, line 61, for "110-112° C." read -- 110-120° C. --.

Signed and sealed this 13th day of August 1963.

(SEAL)
Attest:

ERNEST W. SWIDER
Attesting Officer

DAVID L. LADD
Commissioner of Patents